United States Patent
Trapnell

[11] Patent Number: 5,904,007
[45] Date of Patent: May 18, 1999

[54] TERMITE BARRIER

[75] Inventor: Terry John Trapnell, 39 Lochlomond Dve, Banora Point, New South Wales 2486, Australia

[73] Assignee: Terry John Trapnell, New South Wales, Australia

[21] Appl. No.: 08/709,384

[22] Filed: Sep. 6, 1996

[30] Foreign Application Priority Data

Sep. 7, 1995 [AU] Australia .................................. PN5282

[51] Int. Cl.⁶ .................................................. E04B 1/72
[52] U.S. Cl. .............................. 52/101; 52/62; 428/595; 428/603
[58] Field of Search .................................. 52/58, 59, 62, 52/101, 302.6, 731.7; 428/595, 598, 603, 599, 152, 163, 167, 181, 182

[56] References Cited

U.S. PATENT DOCUMENTS

| | | | |
|---|---|---|---|
| 2,154,734 | 4/1939 | Doing | 52/302.6 |
| 2,316,660 | 4/1943 | Bailey | 52/101 |
| 3,086,324 | 4/1963 | Cheney | 52/58 |
| 3,243,926 | 4/1966 | Keyt | 52/58 |
| 3,415,020 | 12/1968 | Windle | 52/58 |

FOREIGN PATENT DOCUMENTS 2228752  9/1990  United Kingdom .................. 52/731.7

OTHER PUBLICATIONS

American Builder; p. 46; Apr. 1943.

Primary Examiner—Michael Safavi
Attorney, Agent, or Firm—Mathews, Collins, Shepherd & Gould, P.A.

[57] ABSTRACT

A termite barrier for masonry buildings having a concrete slab. The barrier consists of a profiled sheet of termite resistant material which is set into the slab and the masonry wall during construction. The profiled sheet has movement resisting deformations and one or more regions of curvature which resist sheer fracture of the barrier. Preferred profiles are Z-shaped and T-shaped.

3 Claims, 1 Drawing Sheet

TERMITE BARRIER

BACKGROUND OF THE INVENTION

This invention relates to the protection of buildings from subterranean termites and is particularly concerned with physical termite barriers for incorporating into concrete slab-on-ground buildings having a masonry veneer cladding, during their construction.

Subterranean termites typically build nests just beneath the soil surface and forage, principally for cellulose containing material, for distances which can reach hundreds of meters from their nests. Termite damage to buildings, particularly residential buildings can be as many as one building in five in some parts of Australia, costing the community many tens of millions of dollars annually in the repair of the affected timber. As a result, the Australian Building Code has made it compulsory for all new buildings to incorporate suitable termite barriers. The current Building Code is laid down in Australian Standard 3660.1-1995. This standard specifies three permissible systems for protecting concrete slabs from termite penetration. The systems comprise the use of stainless steel mesh, graded stone or chemicals.

Chemical soil barriers have recently come under attack by environmentalists on the basis that their toxicities may be harmful to man. This has lead to the banning of conventional chemicals and the use of more environmentally friendly materials. Unfortunately such materials are less effective and may have no effect whatsoever after as little as twelve months from application.

Graded stone barriers must satisfy a large number of criteria to be effective. The stones must be of crushed igneous or metamorphic origin, be from a sound source, have a minimum sg of 2.52, and be graded and shaped so that the termites cannot lift them or penetrate their voids. A typical product meeting these requirements is GRANIT-GARD® which is a granite stone supplied by CSR Readymix, a Division of CSR Limited. The problem with such products, however, is that they cannot effectively be used on sloping ground surfaces, supply in many parts of Australia is difficult, and they are relatively expensive.

Stainless steel mesh barriers are consequently now in widespread use. These barriers are, nevertheless, not without their drawbacks. Apart from their relatively high cost which cannot be avoided, there are particular problems when it comes to their installation at the perimeter of concrete slabs having masonry veneer walls. The commonly used method comprises parging an inner edge of the mesh to the perimeter of the slab and extending the mesh out under the row of bricks which is substantially level with the slab. The parging material is an adhesive which is required to be termite resistant, form a strong bond between the mesh and the concrete, and be durable over the life expectancy of the building. In practice, however, it is difficult to form a proper seal with the parging material due to the relative movement between the bricks and the concrete slab due to different rates of drying, and expansion and contraction taking place. The integrity of the seal is therefore frequently broken and regions for termite entry are provided.

OBJECT OF THE INVENTION

It is therefore an object of the present invention to provide a new form of termite barrier which is less expensive than the aforementioned barriers, can be readily installed, and is 100% effective during the reasonable life expectancy of the building.

SUMMARY OF THE INVENTION

According to one aspect of the present invention there is provided a physical termite barrier for incorporating in the perimeter of a concrete slab and in an adjacent masonry wall during the construction of the slab, said barrier comprising a continuous sheet of termite resistant material having a substantially Z-shaped profile incorporating movement resisting deformations, and curved regions where the three planes of the sheet meet which function to assist the barrier to resist sheer fracture when the barrier is set in the concrete slab and masonry wall.

Preferably, an expansion joint material is provided on the mid planar region of the sheet, on the inner surface thereof for the purpose of maintaining a concrete-free cavity between the brick and the concrete slab during the pouring thereof. Such a cavity will provide additional freedom of movement of the barrier without fracture due to movement caused by contraction or expansion of the slab. Suitable expansion joint materials include foamed plastics such as polyurethane and polystyrene, and foamed rubber such as neoprene. Many other materials of similar properties to these may also be used as long as they are moisture resistant.

The barrier can be fabricated from a range of termite resistant sheet materials including sheet metals and sheet plastics materials. Sheet plastics materials include polypropylene and polyethylene. Sheet metals include stainless steel, galvanised iron, copper, zincalum, aluminium and metal alloys. Galvanised iron is preferred because of its relative inexpense and ease of production in the required profile by roll forming. A particularly preferred galvanised iron is 0.6 mm/Z600 gal. coated iron.

The movement resisting deformations in the body of the barrier are provided to ensure that there is good physical locking with the mortar in the brickwork/blockwork and the concrete slab, and in the concrete slab itself. The deformations may be formed in each planar section of the barrier and are preferably formed in at least the two terminal planar sections. The deformations can assume any configuration which gives the desired end result. Typical configurations are groove/ridge formations extending longitudinally of the barrier. Preferably there is at least one groove/ridge formation in each of the end planar sections.

The curved regions connecting the three planes of the barrier ideally form regular radial curvatures. Such regions enable the barrier to flex by significant amounts, as could occur for instance in ground tremors or contracting slabs, without the region of curvature being subjected to any strain which could result in the barrier being fractured at that point.

The barrier thus described is arranged in situ with one end planar section extending substantially horizontally in the concrete slab, inwardly of the perimeter, the other planar end section extending in the masonry mortar over the upper surface of the upper row of perimeter bricks/blocks, and the intermediate planar section extending perpendicularly within the slab adjacent the perimeter thereof.

Such a barrier can be readily produced by roll forming, in the case of sheet metal, or extruded, in the case of sheet plastics material, in a relatively inexpensive manner. It can be readily fitted over the brickwork into the proposed slab region prior to pouring of the concrete, and it maintains its position during the pouring. Additional use of break-away clips on the outer edge of the barrier can further assist the barrier from deflection as the concrete slab is being laid.

According to another aspect of the present invention there is provided a physical termite barrier for incorporating in the perimeter of a concrete slab and in an adjacent masonry wall during the construction of the slab, said barrier comprising a continuous sheet of termite resistant material having two planar sections at substantially right-angles to one another which incorporate movement resisting deformations, said planar sections being joined together by a continuously curved section.

The continuously curved section can preferably be arranged to project above the surface of the finished concrete slab, in the cavity between the brick/blockwork and the framework of the building.

Ideally, expansion joint material of the type previously described can be incorporated in the continuously curved section.

This second embodiment of the invention can be fabricated from the same materials as mentioned above for the first embodiment.

The barrier according to both embodiments of the invention provides an effective termite barrier for the life of the building and does not have any of the problems associated with the aforementioned systems in current use.

It is to be understood that the concept of the invention involves the use of a solid termite sheeting material which is designed to resist movement when in situ without giving in to stresses which would otherwise lead to shear fracture. With this understanding in mind it will therefore be appreciated that the precise configuration of the barrier can vary beyond the one described above.

DESCRIPTION OF PREFERRED EMBODIMENTS

Figure 1:
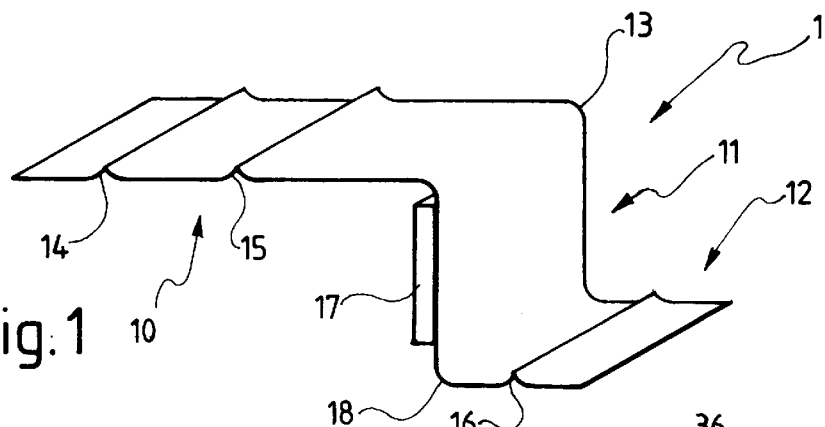
FIG. 1 is a top respective view of a termite barrier according to one aspect of the present invention.

Preferred embodiments of the invention will now be described with reference to the accompanying drawings. In all the drawings, like reference numerals refer to like parts.

Referring firstly to FIG. 1, the termite barrier 1 is a roll formed sheet galvanised material having a right-angled Z-shaped profile. The barrier has three substantially planar sections 10, 11, 12 connected by curved regions 13, 18. The end planar section 10 has movement resisting ridges/grooves 14, 15 formed longitudinally in its surface. A similar longitudinal groove 16 is formed in the other end planar section 12.

The mid planar section 11 has a joint expansion material 17 adhered to its inner face. The joint expansion material 17 is formed from sheet neoprene foam which is fixed to the mid planar section 11 by means of a suitable rubber based adhesive.

Figure 2:
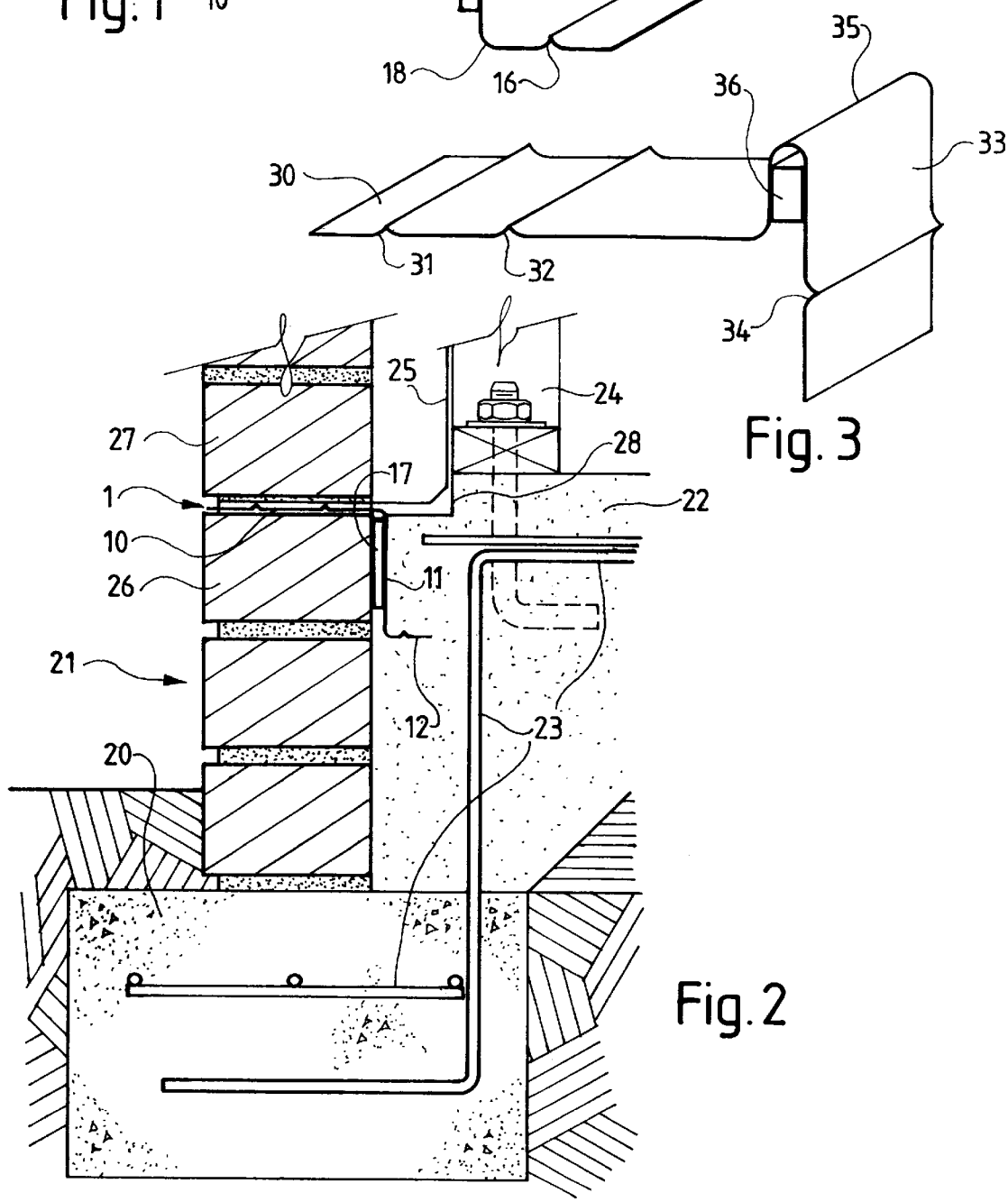
FIG. 2 is a cross-sectional view of the termite barrier shown in FIG. 1 in situ.

The termite barrier is fitted over the top row of bricks which defines the level of the concrete slab to be poured, and when the slab has been poured will be positioned as depicted in FIG. 2 to which reference is now made.

In FIG. 2, a partial cut away view of a conventional constructional arrangement for a cavity brick residential building is shown.

The arrangement consists of footings 20, brickwork 21, concrete slab 22, reinforcement 23, internal framework 24 and damp course 25. It will be observed that the termite barrier 1 has its end planar section 10 located in the mortar joint between rows of bricks 26, 27. Brick row 26 is the row which defines the upper level of the slab which, in this case, is rebated at 28. The mid planar section 11 extends perpendicularly into the concrete slab at the perimeter thereof and is separated from the brick row 26 by the strip of neoprene foam 17. The end planar section 12 extends horizontally into the concrete slab.

Such a barrier prevents perimetric penetration of the concrete slab by termites and maintains its integrity during slab or brickwork movement. Retention of the barrier in situ is ensured by the movement resisting deformations 14, 15, 16 formed therein. Slab or brickwork movement is transferred to the curved regions of the barrier where deformation at these places only occurs. This means that the barrier can adjust its shape at these regions without its integrity being compromised.

Figure 3:
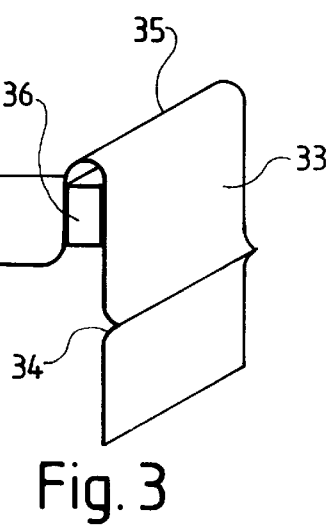
FIG. 3 is a top perspective view of a termite barrier according to another aspect of the present invention.

The modified barrier depicted in FIG. 3 is particularly useful for concrete slabs which are not rebated but are level with the top row of bricks 26. It can however be used in rebated concrete slabs with similar effects to those of the previously described barrier.

The modified barrier has a first planar section 30 with longitudinal movement resisting grooves 31, 32 and a second planar section 33 with a longitudinal movement resisting groove 34. Connecting the two planar sections is a continuously curved section 35 which accommodates a foamed neoprene material 36. The neoprene material assists the continuously curved section to act as an expansion joint.

In use, the first planar section 30 is accommodated in the mortar joint between the top row of bricks which defines the concrete slab level and the next row of bricks up. The continuously curved section extends upward in the cavity between the bricks and the framework of the building, and the second planar section 33 extends downwardly into the concrete slab.

Once again, such a barrier prevents termite entry at the perimeter of the slab and its integrity is not affected by movements in the concrete slab or the adjacent brickwork.

Whilst the above has been given by way of illustrative example of the invention, many modifications and variation may be made thereto by persons skilled in the art without departing from the broad scope and ambit of the invention as herein set forth.

I claim:

1. A physical termite barrier for incorporating in the perimeter of a concrete slab and in an adjacent masonry wall during the construction of the slab, said barrier comprising a continuous sheet of termite resistant material having a substantially Z-shaped profile incorporating movement resisting deformations and curved regions where the three planes of the sheet meet which function to assist the barrier to resist sheer fracture when the barrier is set in the concrete slab and masonry wall and including an expansion joint material on a mid planar region of the sheet, on an internal surface thereof.

2. A physical termite barrier as claimed in claim 1, wherein the expansion joint material is fabricated from foamed plastics material.

3. A physical termite barrier for incorporating in the perimeter of a concrete slab and in an adjacent masonry wall during the construction of the slab, said barrier comprising a continuous sheet of termite resistant material having two planar sections at substantially right-angles to one another which incorporate movement resisting deformations, said planar sections being joined together by a continuously curved section and including an expansion joint material in the continuously curved section.

* * * * *